United States Patent [19]
Spivey et al.

[11] Patent Number: 5,967,536
[45] Date of Patent: Oct. 19, 1999

[54] ADJUSTABLE FRONT SUSPENSION REPLACEMENT KIT

[76] Inventors: Bart W. Spivey, HC 70 Box 4253, Sahuarita, Ariz. 85629; Patrick M. Walsh, 6802 N. Table Mountain Rd., Tucson, Ariz. 85718

[21] Appl. No.: 08/918,550

[22] Filed: Aug. 22, 1997

[51] Int. Cl.$^6$ .............................. B60G 7/00; B62D 17/00
[52] U.S. Cl. .................. 280/124.141; 280/86.751
[58] Field of Search .................. 280/86.75, 86.751, 280/86.752, 86.753, 124.135, 124.136, 124.137, 124.141, 124.145, 124.146

[56] References Cited

U.S. PATENT DOCUMENTS

| | | | |
|---|---|---|---|
| 2,882,065 | 4/1959 | Von Rucker | 280/124.141 |
| 2,913,251 | 11/1959 | Herbenar | 280/124.136 |
| 3,202,441 | 8/1965 | Tea | 280/124.137 |
| 3,551,990 | 1/1971 | Wehner | 280/124.141 |
| 3,630,303 | 12/1971 | Froumajou | 280/124.136 |
| 3,856,323 | 12/1974 | Arning et al. | 280/124.141 |
| 4,869,527 | 9/1989 | Coddens | 280/86.753 |

*Primary Examiner*—Paul N. Dickson
*Attorney, Agent, or Firm*—Steven G. Lisa; Douglas W. Rudy

[57] ABSTRACT

A system and method is disclosed for converting stock MacPherson strut suspension systems for a host automobile to a double A-arm type of suspension system using only stock or pre-existing mounting locations and only ordinary hand tools. The system and method uses a lower A-arm that mounts in the stock mounting locations of the frame that held the stock lower control arm of the original MacPherson strut suspension system. A upper A-arm conversion bracket mounts to stock fastener locations on the main frame, and is configured to securely hold the replacement upper A-arm. A replacement spindle is mounted between the upper and lower A-arms, and holds the stock hub and brake assemblies. The original steering arm is coupled to the replacement spindle, and the original sway bar is coupled to the replacement lower A-arm. A coil-over shock is mounted to the lower control arm and the conversion bracket. The kit bolts in place on the host vehicle without any modification to the original frame or body work.

13 Claims, 7 Drawing Sheets

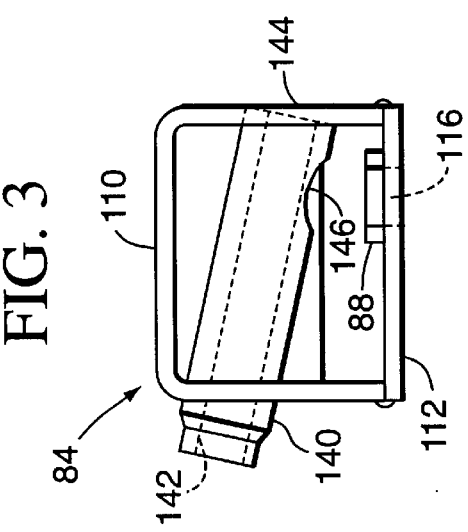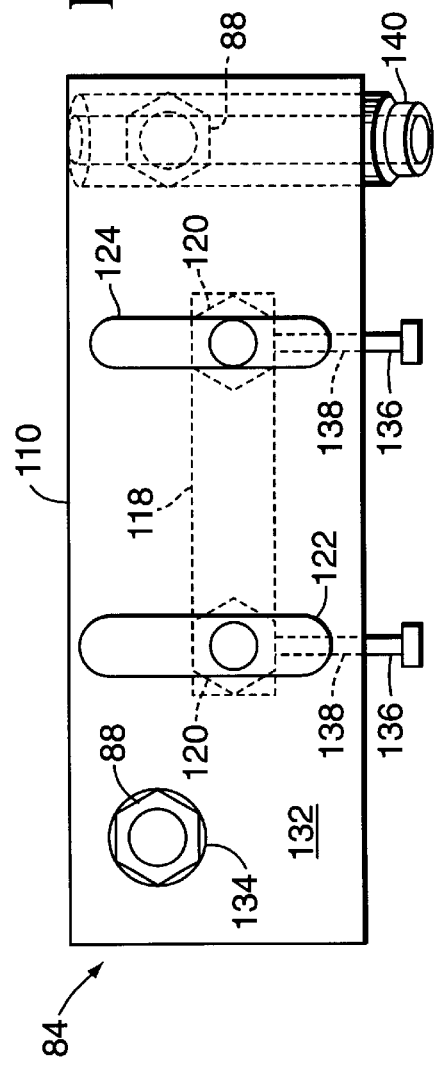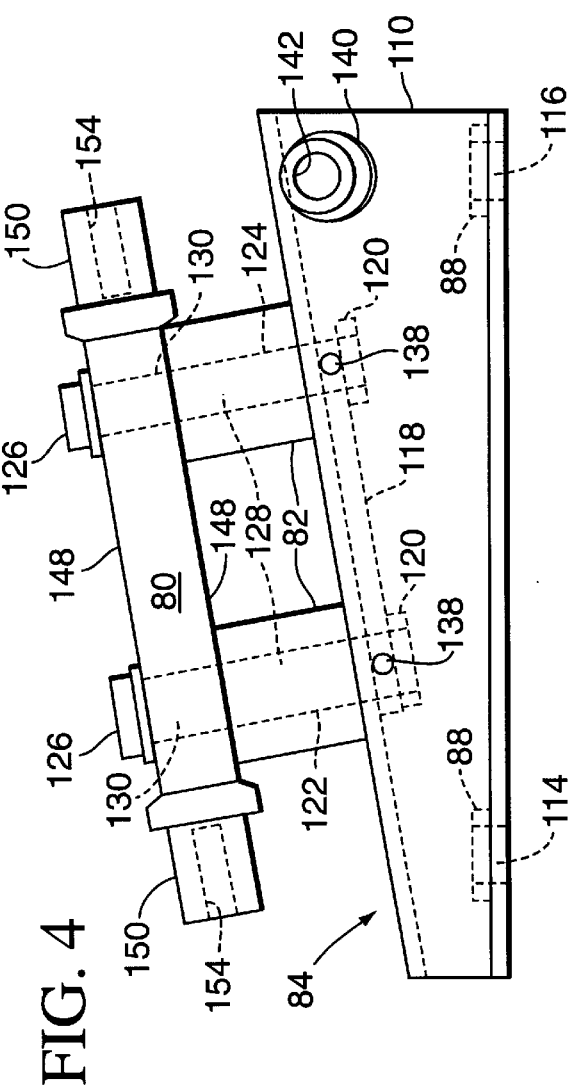

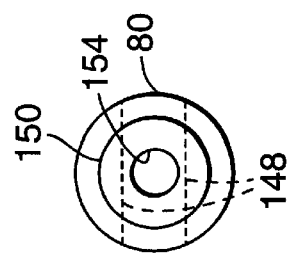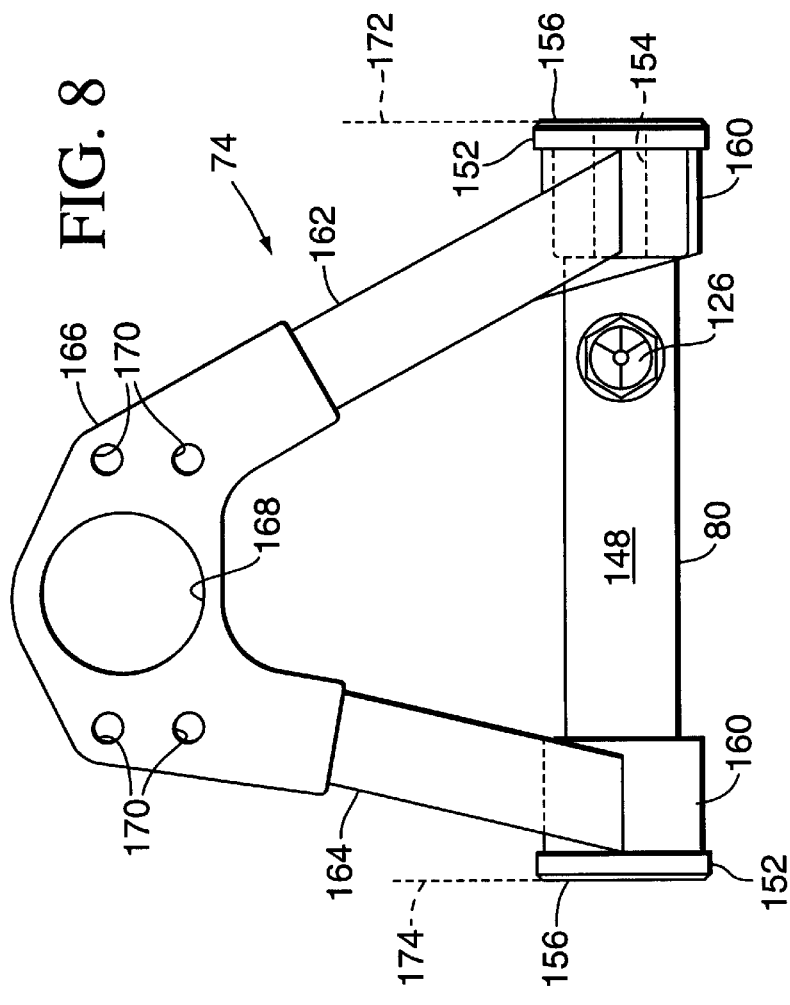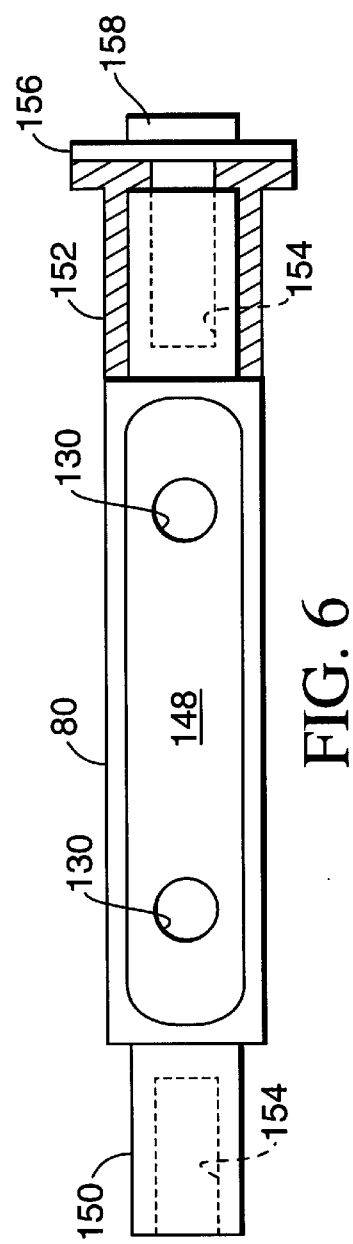

5,967,536

ADJUSTABLE FRONT SUSPENSION REPLACEMENT KIT

BACKGROUND OF THE INVENTION

1. Field of the Invention

This invention relates generally to automotive aftermarket equipment, and more specifically, to a kit of components making up an independent front suspension system for an automobile. Automotive suspension systems of the type using MacPherson struts may be replaced by the invention presented herein to provide an improved, fully independent, double A-arm type of front suspension.

2. Description of the Prior Art

In the evolution of the modern automobile, the proper handling characteristics of the vehicle have become increasingly more important. Automobile manufacturers attempt to design the suspension system to provide predictable steering input, while at the same time recognizing that production vehicles are used by a broad range of drivers. Also important to automobile manufacturers are cost, reliability and ease of repair. Thus, manufacturers of modern automobiles attempt to balance many factors in designing suspension systems, which often results in compromises in certain areas.

One type of steerable front suspension is a "double wishbone" system. In this commonly used system, a lower A-arm, the first of the two "wishbones" comprising the "double wishbone," is pivotally connected to a suspension mounting location at the front of the vehicle. An upper A-arm forms the second "wishbone," and is connected to a second attachment point. A pivoting vertical spindle connects the upper and lower A-arms at their outboard ends, and usually includes a hub to which the wheel and brake components are attached. Typically, a steering arm controllably pivots the spindle between upper and a lower ball-joints. An alternative embodiment is the use of a king pin, which is an older method of providing pivoting capability, between the upper and lower A-arms. A spring and shock absorber are associated with one or both of the A-arms to provide support for the vehicle and damping of the spring. A sway bar is also usually attached to the lower A-arm of both front wheels, and depending on its adjustment, can prevent the suspension from moving in opposite vertical directions relative to the frame.

Because of the independent adjustability of both the upper and lower A-arms, the front suspension characteristics for automobiles with wishbone-type suspension can be specifically tuned to optimize performance over a wide variety of conditions. In particular, in high-performance applications such as automobile racing, it is common to tune the camber, castor, bump-steer, Ackerman and other suspension characteristics by carefully aligning the upper and lower A-arms relative to the vehicle frame for specific race track or road conditions.

A second common type of suspension system is the "MacPherson strut" system. A MacPherson strut suspension system uses a lower control arm and a vertical strut that incorporates a spring, a shock absorber and an upper and a lower bearing assembly that allows the strut to rotate responsive to steering input. The lower control arm is typically mounted at its inboard region to the automobile frame, and the upper portion of the strut is usually mounted to a region of the automobile body above and inboard of the wheel well. The MacPherson strut suspension arrangement is generally viewed as a utility suspension that can be made inexpensively, and provides adequate handling in a "street" vehicle. It is especially useful in front-wheel drive vehicles, where its compactness allows space for drive shaft connections to the wheel assembly. It is also relatively inexpensive to manufacture in comparison to the double-wishbone system discussed above.

However, the use of the MacPherson strut suspension arrangement does not provide optimum handling characteristics for high-performance applications. In particular, it is well known that the range of adjustability for MacPherson strut suspension systems are somewhat limited, particularly in the area known as "bump steer" (i.e., change in toe or camber as the wheel travels through varying "bump" and "droop" conditions). Thus, in high-performance applications, the use of a MacPherson strut is not desirable, and is considered inferior to the double A-arm or double-wishbone type of suspension.

Unfortunately, many automobiles that are sold as "high-performance" vehicles include MacPherson strut front suspensions, primarily because the manufacturer desires to save cost. One such automobile is the late model Ford Mustang made from 1979 through to the present. The Ford Mustang is a popular, rear-drive, high-performance street vehicle that is sold in large numbers and includes the undesirable MacPherson strut front suspension. Because the Mustang is a rear-wheel drive vehicle, there is no reason other than cost-saving for including the inferior MacPherson strut front suspension instead of the double A-arm suspension.

Thus, the need exists to provide a cost-effective conversion kit that allows the MacPherson strut front suspension on rear-wheel drive vehicles, such as the late model Ford Mustang, to be easily converted to the double-wishbone A-arm type of suspension.

SUMMARY OF THE INVENTION

It is an object of this invention to provide a kit of suspension components that allows one of marginal mechanical skill to replace a MacPherson strut front suspension on a host automobile with a double-wishbone A-arm type of suspension, using commonly available hand tools.

It is another object of this invention to provide an aftermarket kit that allows a double-wishbone A-arm type of front suspension to be easily installed on late-model Ford Mustang vehicles.

It is another object of this invention to provide a high-performance front suspension kit that allows a MacPherson strut front suspension on a rear-wheel drive host vehicle to be replaced with a fully adjustable double-wishbone A-arm type of suspension, without requiring any welding, cutting, or alteration of the stock vehicle suspension mounting locations.

It is another object of this invention to provide a high-quality front suspension kit that allows a MacPherson strut front suspension on a rear-wheel drive host vehicle to be replaced with a double-wishbone A-arm type of suspension, while still using stock mounting locations, steering arm, sway bar and brake components.

It is another object of this invention to provide an aftermarket conversion kit for the front suspension of a late model Ford Mustang that is cost effective and easy to install without modifying the existing frame or body of the Mustang.

It is also an object of this invention to provide a kit of materials that replaces the MacPherson strut front suspension on a rear-wheel drive vehicle with a double wishbone suspension system that is fully adjustable, including caster, camber, toe, bump-steer and Ackerman adjustments, and that can be tuned for specific performance characteristics dictated by the vehicle driver.

It is another object of this invention to provide a bolt-on suspension kit to replace the MacPherson strut front suspension on Ford Mustangs made from 1979 to the present with a high-performance, independent and adjustable, double wishbone suspension that is durable, cost-effective, and easily installed.

It is a further object of this invention to provide a bolt-on suspension kit to replace the MacPherson strut front suspension on Ford Mustangs made from 1979 to the present with a high-performance, independent and adjustable, double-wishbone type suspension that improves the handling, cornering, ride control and braking dynamics of the vehicle.

It is also an object of this invention to provide a bolt-on suspension kit to replace the MacPherson strut front suspension on Ford Mustangs made from 1979 to the present using as many "off the shelf" components as are possible to keep manufacturing cost at a minimum.

It is another object of this invention to provide a conversion bracket that allows the replacement of a stock MacPherson strut-type front suspension with a double A-arm suspension that is installed on stock frame mounting locations of a vehicle frame.

It is another object of the invention to provide anti-dive geometry for the replacment suspension by either making the conversion bracket higher at its front end relative to the vehicle, or by providing different sized spacers or stantions between the upper A-arm and the conversion bracket.

The above and other objects are achieved with a kit of components that replaces a stock MacPherson strut and spring front suspension assembly on a host vehicle without requiring any modification to the vehicle frame or body work. In its stock configuration, the host vehicle includes: (i) front left and right steering arms; (ii) a front stabilizer bar; (iii) front left and right MacPherson struts; (iv) front left and right springs; (v) front left and right wheel hub and brake assemblies, each including a brake rotor assembly and brake caliper; and (vi) a front frame portion comprised of main ladder frame elements and a transverse sub-frame. The main ladder frame of the vehicle is bolted to a raised portion of the transverse sub-frame that is configured to retain the stock spring. The transverse sub-frame includes original inboard mounting locations for a lower control arm of the stock Macpherson strut suspension assembly, and the main ladder frame includes a relatively flat shelf portion proximate the location where it is bolted to the raised portion of the transverse sub-frame.

The replacement kit of components includes left and right lower A-arm assemblies, with each A-arm assembly being constructed with two arms having inboard mounting locations that mate with original inboard mounting locations for the respective lower control arms of the stock Macpherson strut suspension assembly. At least one arm of each lower A-arm assembly includes a lower shock mount, and a stabilizer bar mount located to receive the end of the stock stabilizer bar. Left and right upper A-arm conversion brackets are configured to bolt to the shelf portion of the main ladder frame at stock locations where the main ladder frame is bolted to the raised portion of the transverse sub-frame. Each conversion bracket includes upper A-arm mounting locations and an upper shock mounting location. Left and right upper A-arns are mounted to respective left and right upper A-arm mounting locations of the left and right upper A-arm conversion brackets. Left and right replacement spindles are coupled between the replacement left and right upper and lower A-arms, respectively. Each spindle includes a steering arm mount located to receive the stock steering arm, an axle mount configured to receive the stock wheel hub and brake rotor assembly, and a main spindle plate including brake mounting locations for the stock brake calipers. Left and right shock and spring assemblies are coupled between the lower shock mount of the respective left and right lower A-arm and upper shock mount of the respective left and right upper A-arm conversion brackets.

The left and right upper A-arm conversion brackets also include a camber adjusting system formed of two parallel adjustment slots. The left and right upper A-arms are coupled to left and right upper A-armn cross-shafts. Each cross-shaft includes two inboard fastener apertures spaced to mate with the two parallel adjustment slots in the camber adjuster. A pair of cross-shaft camber adjustment stantions include a fastener bore and are configured to fit between one of the parallel camber adjustment slots of the conversion bracket and the fastener aperture of the upper A-arm cross-shaft. The cross-shaft is mounted to the conversion bracket with adjustable fasteners, such as heavy duty bolts, that are inserted through the fastener apertures of each cross shaft, through the cross-shaft camber stantions, and through the parallel adjustment slots of the camber adjuster, where they are threaded into captive nuts. Wheel camber is adjusted by loosening the fasteners, moving the upper A-arm cross-shaft in or out relative to the conversion bracket, and then re-tightening the bolts.

Anti-dive geometry can be incorporated in the replacement suspension system. In a preferred form, the conversion bracket is formed so that its top support surface is angled downward from the front of the vehicle, thereby holding the upper A-arm so that the leading and trailing arms define a plane that is angled down from the front of the vehicle relative to the back of the vehicle. In an alternate embodiment, the conversion bracket could be manufactured so that its upper surface is relatively horizontal, with a larger stantion or spacer placed between the front cross-shaft fastener aperture and the support surface, thereby causing the A-arm assembly to be held in the desired anti-dive configuration.

The steering arm mount of the kit includes a bump-steer box configured to retain a plurality of spacers of varying thickness in a variety of combinations to allow adjustment of vehicle bump steer characteristics. By varying the thickness and placement of the bump-steer spacers in the bump-steer box, the bump-steer characteristics of the vehicle can be altered.

In its preferred form, the kit is designed for a host vehicle that is a 1979 or later Ford Mustang. In that vehicle, the transverse sub-frame comprises a stock Mustang K-member including a raised spring perch that is bolted to the front portion of the main ladder frame member with two spaced apart bolts. Each lower A-arm is mounted to original-ing locations in the stock Mustang K-member for the lower MacPherson strut control arm. Each upper control arm conversion bracket is mounted to the main ladder frame member using the original apertures for the two spaced-apart bolts that couple the front portion of the main ladder frame member to the spring perch of the K-member.

The above and other objects are also achieved with a method of replacing a stock MacPherson strut front suspension system on a host vehicle with a double A-arm suspension system. The host vehicle includes stock: (i) front left and right steering arms; (ii) a front stabilizer bar; (iii) front left and right MacPherson struts having top portions mounted to the vehicle; (iv) front left and right lower control arms coupled to the stabilizer bar; (v) front left and right spindles coupled to the steering arms and between the MacPherson struts and the lower control arms; (vi) front left and right wheel and brake assemblies mounted to the spindles; and (vii) a front frame portion comprised of longitudinal main frame elements and a transverse sub-frame. The longitudinal main frame is bolted proximate the front wheels to a raised portion of the transverse sub-frame at original frame bolt locations. The transverse sub-frame includes original inboard mounting locations for the stock lower control arm. The longitudinal main frame includes a shelf portion proximate the location where it is bolted to the raised portion of the transverse sub-frame.

The method comprises the initial act of disconnecting and removing the stock MacPherson strut suspension from the host vehicle. This includes: (a) disconnecting the stock steering arms from the stock spindles; (b) disconnecting the stock stabilizer bar from the stock lower control arms; (c) removing the stock wheel and brake assemblies from the stock spindles; (d) disconnecting the stock lower control arms from the transverse sub-frame; (e) removing the stock spring; (f) disconnecting the stock MacPherson strut from the vehicle; and (g) removing the bolts that connect the main ladder frame to the raised portion of the transverse sub-frame from their original frame bolt locations. Thereafter, the replacement suspension components are attached to original mounting locations on the stock vehicle frame. This includes: (a) attaching a replacement lower A-arm to the original inboard mounting locations for the stock lower control arm; (b) bolting an upper A-arm conversion bracket to the relatively flat shelf portion of the main ladder frame using the original frame bolt locations; (c) mounting an upper replacement A-arm to the conversion bracket; (d) coupling a replacement spindle between the upper and lower replacement A-arms; (e) attaching the stock steering arms to steering armn mounts on the replacement spindles; (f) attaching the stock stabilizer bar to stabilizer bar mounts on the replacement lower A-arms; (g) mounting the stock wheel and brake assemblies to the replacement spindles; and (h) mounting a replacement coil-over shock between a lower shock mount on the lower A-arm and an upper shock mount on the conversion bracket.

In its preferred form, the act of mounting the upper replacement A-arm to the conversion bracket comprises bolting an upper A-arm cross-shaft through camber adjustment apertures in the conversion bracket. As a result, the camber of the vehicle can be adjusted by sliding the upper A-arm in the camber adjustment apertures. Also, the steering arm mount includes a bump steer box, and the act of attaching the stock steering arm to the replacement lower A-arm includes adjusting the bump steer characteristics of the vehicle by placing bump steer spacers between the bump steer box and the steering arm.

The above and other objects are also achieved with a conversion bracket that allows a replacement A-arm assembly to be installed on a host vehicle in place of a stock MacPherson strut assembly. The replacement A-arm assembly includes two arms that are coupled together at their outboard ends and extend apart from each other in an inboard direction. The conversion bracket includes an interface plate having at least two fastener apertures that are located to attach the interface plate to the host vehicle using stock fastener locations on the vehicle. An support surface including two extended camber/castor channels is coupled to the interface plate with two side support plates. The conversion bracket includes an adjustable A-arm retention system that holds the outboard ends of the A-arms in the camber/castor channels. The conversion bracket further includes a shock mount configured to hold a replacement shock absorber. To provide for anti-dive geometry, the support surface can be angled downward from the front of the vehicle towards the rear of vehicle. Alternatively, different sized spacers can be provided to allow for varying the angle at which the upper A-arm is retained on the conversion bracket.

In its preferred form, the adjustable A-arm retention system holds the upper A-arm on the conversion bracket in a manner that allows for easy adjustment of the camber and castor. A camber/castor adjustment plate has two fastener apertures that are spaced so as to align with the two camber/castor channels in the support surface. The plate is positioned between the interface plate and angled support surface. An A-arm cross-shaft has axle surfaces formed at each end so that they may be rotatably coupled retained in sleeves formed at the inboard ends of the A-arms. The cross-shaft also includes two fastener apertures between the inboard ends of the A-arms spaced so as to align with the two camber/castor channels. Two support stantions are placed between the angled support surface and the cross-shaft, each stantion including a central bore aligned with the fastener apertures in the adjustment plate and the cross-shaft, and further aligned with the camber/castor channels. The adjustable retention system is fastened together with two fasteners. Each fastener is inserted through one of the aligned fastener apertures in the cross-shaft, through the central bore of an aligned stantion, through an aligned camber/castor channel, and through an aligned aperture in the adjustment plate. In its preferred form, the fastener is a heavy duty bolt, and a captive nut is retained on the backside of the adjustment plate. Once the camber and castor are set, the bolts are tightened into the nuts.

The preferred embodiments of the invention presented here are described below in the Figures and Detailed Description. Unless specifically noted, it is intended that the words and phrases in the specification and the claims are given the ordinary and accustomed meaning to those of ordinary skill in the applicable arts. If any other special meaning is intended for any word or phrase, the specification will clearly state and define the special meaning.

Likewise, the use of the words "function" or "means" in the Detailed Description is not intended to indicate a desire to invoke the special provisions of 35 U.S.C. 112, Paragraph 6, to define the invention. To the contrary, if the provisions of 35 U.S.C. 112, Paragraph 6 are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to invoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, material or acts for performing the claimed function.

For example, the preferred embodiment is particularly directed to replacing a MacPherson strut suspension with an upper and lower A-arm assembly for the Ford Mustang made from 1979 to the present. However, it is anticipated that this invention could also be used in the replacement of MacPherson strut assemblies in other makes or models of automobiles or trucks. For example, many of the vehicles made today include MacPherson strut front suspension assemblies. The present invention is applicable to any such vehicle, including front wheel drive vehicles, having stock mounting locations to which either the replacement A-arms or a conversion bracket can be mounted.

BRIEF DESCRIPTION OF THE DRAWINGS

A preferred embodiment of the invention will now be described by way of example with reference to the accompanying drawings. Although several embodiments of the invention are described and shown, like reference numbers identify like parts in each of the figures, in which:

FIG. 3 is an endwise elevation view of an upper A-arm conversion bracket with an attached A-arm cross-shaft, as viewed from the front of the vehicle;

FIG. 4 is a side elevation view of the upper A-arm conversion bracket shown in FIG. 3;

FIG. 5 is a top view of the upper A-arm conversion bracket of FIG. 3;

FIG. 6 is a top view of an upper A-arm cross-shaft;

FIG. 7 is a end view of an upper A-arm cross-shaft;

FIG. 8 is a top view of an upper A-arm assembly;

DESCRIPTION OF THE PREFERRED EMBODIMENT

This invention relates to a kit of suspension components that allows one of marginal mechanical skill to replace a MacPherson strut front suspension on a host automobile with a double-wishbone A-arm type of suspension, using commonly available tools. In its preferred embodiment, the kit is designed for the late-model Ford Mustang that was manufactured beginning in 1979. However, the basic invention described herein may be applied to other rear-wheel or front-wheel drive automobiles that use MacPherson strut-type front suspension. For front wheel drive vehicles, accommodation must be made for the front half shafts that actually drive the front wheels. The subject vehicle with MacPherson strut front suspension is referred to below as the "host vehicle."

Figure 1:
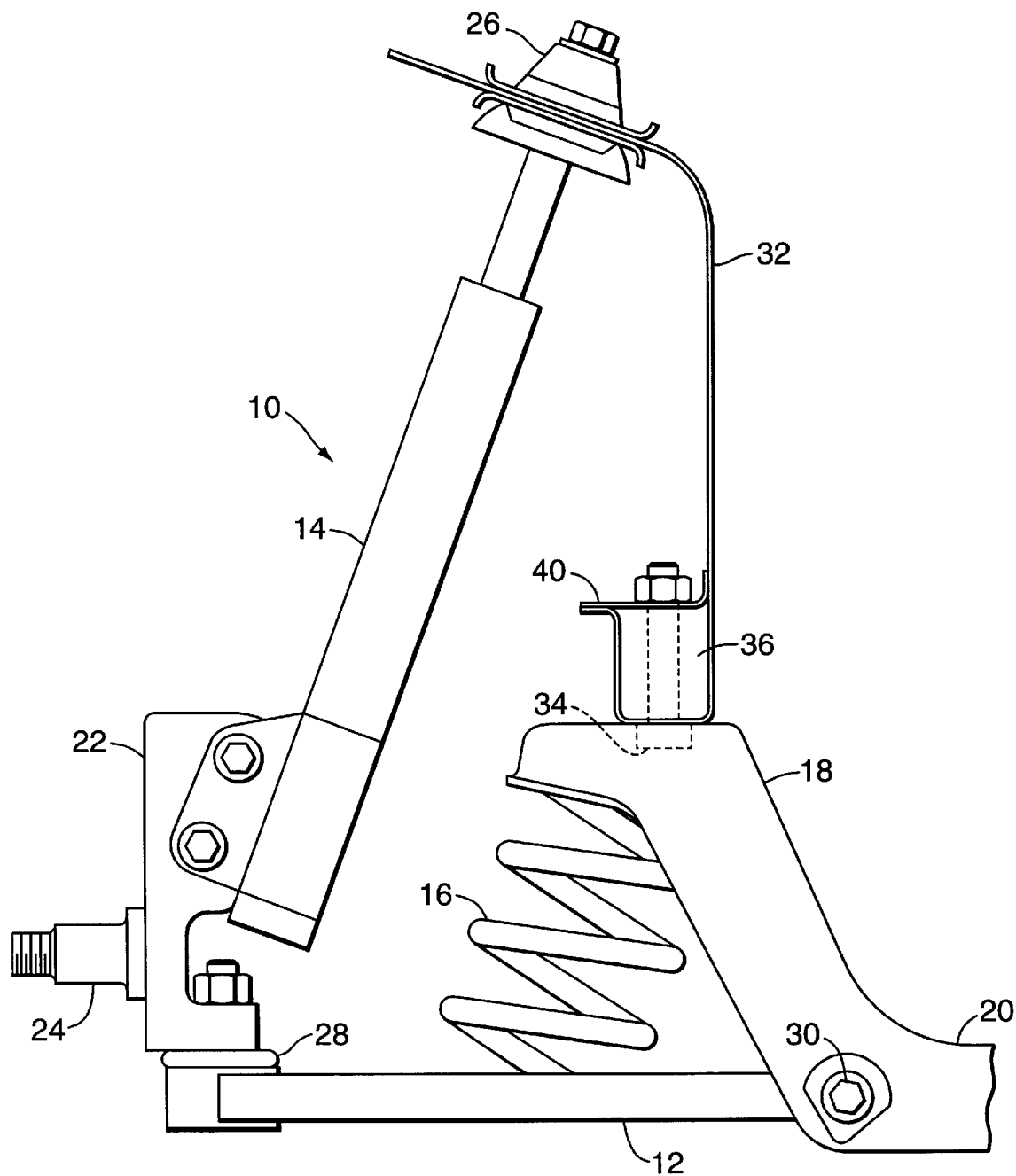
FIG. 1 is a diagrammatic presentation of a standard MacPherson strut suspension installed on a host vehicle.

The host vehicle as originally manufactured includes a stock MacPherson strut suspension system 10 that is coupled to the vehicle, as shown generally in FIG. 1. Typically, the MacPherson strut suspension system 10 uses a lower control arm 12 and a vertical shock strut 14. In some cases, a spring is integral with the vertical shock strut 14, in others, the spring 16 is mounted between the lower control arm 12 and a raised section (or perch) 18 of a lower transverse frame or K-member 20 as shown in FIG. 1. A lower portion of the shock strut is mounted to a stock spindle 22 that includes a wheel or stub axle 24. The entire strut and spindle assembly 10 rotates between upper and lower bearings 26 and 28, in response to steering input from a steering arm (not shown). The lower control arm 12 is typically mounted at its inboard region to the K-member 20 of the automobile frame at front and rear mounting locations 30 (only the front mounting location being shown in FIG. 1). As is well known, the lower control arm usually includes both a leading and trailing arm, and only the leading arm of the control arm 12 is shown in FIG. 1. The upper portion of the strut 14 is usually mounted to a region of the automobile body 32 above and inboard of the wheel well. The K-member 20 is fastened with bolts 34 at its raised spring perch 18 to a longitudinal leg 36 of the main ladder frame of the vehicle.

It should be understood that in a front-wheel drive vehicle, half-shafts (not shown) will extend from the transmission or differential to the wheels to apply power. In addition, stock hub and brake assemblies, including a brake rotor and calipers (not shown), would be carried by the axle 24 and spindle 22.

Prior to installing the replacement suspension system of the present invention, the stock MacPherson strut suspension system 10, including the lower control arm 12, strut 14, spring 16 and spindle 22, are disconnected and removed from the host vehicle, as described below, leaving a plurality of stock or original suspension mounting elements (such as apertures 30 in frame members). For front wheel drive vehicles, the half-shafts must also be removed from the spindles. The stock apertures, some which may be associated with captive nuts, are formed at the factory during the original manufacture of the vehicle, and hold the standard MacPherson strut suspension system.

An important aspect of the present invention is the design of a replacement double-wishbone A-arm type of suspension that makes use of the stock suspension 30 or frame 34 mounting apertures or locations. It is also desirable to use the stock steering arms and sway bar, and their original connecting locations, along with the stock brake assembly. However, it is also necessary to provide a proper suspension geometry that includes acceptable "bump-steer" characteristics with a wide range of adjustability. In other words, it is important that the double-wishbone A-arm suspension have a design geometry that not only uses the original suspension or frame mounting locations, steering arm, sway bar and brake components, but also provides correct camber, caster, toe, bump-steer, and Ackerman settings, all without requiring modification of the frame or body, or the use of other than normal hand tools to install. Thus, the pre-existing (i.e., stock) suspension or frame mounting locations, steering arm, sway bar and brake components are used with the replacement independent suspension kit, and no welding or cutting of the original frame or body is necessary to accommodate the improved suspension.

As will be explained below, in the preferred embodiment designed for a 1979 or later Ford Mustang, it was not possible to use only the stock suspension mounting locations to mount the replacement upper A-arm suspension and the associated coil-over shock. Accordingly, to achieve the goal of making the installation easy, it was necessary to identify on the stock Mustang frame original frame mounting apertures or locations to which a conversion bracket could be bolted. The upper A-arm is then attached to the conversion bracket. Thus, depending on the particular vehicle, it may or may not be necessary to use a conversion bracket, or if one is used, its particular configuration may change depending on the location at which it must be mounted to the frame.

Figure 2:
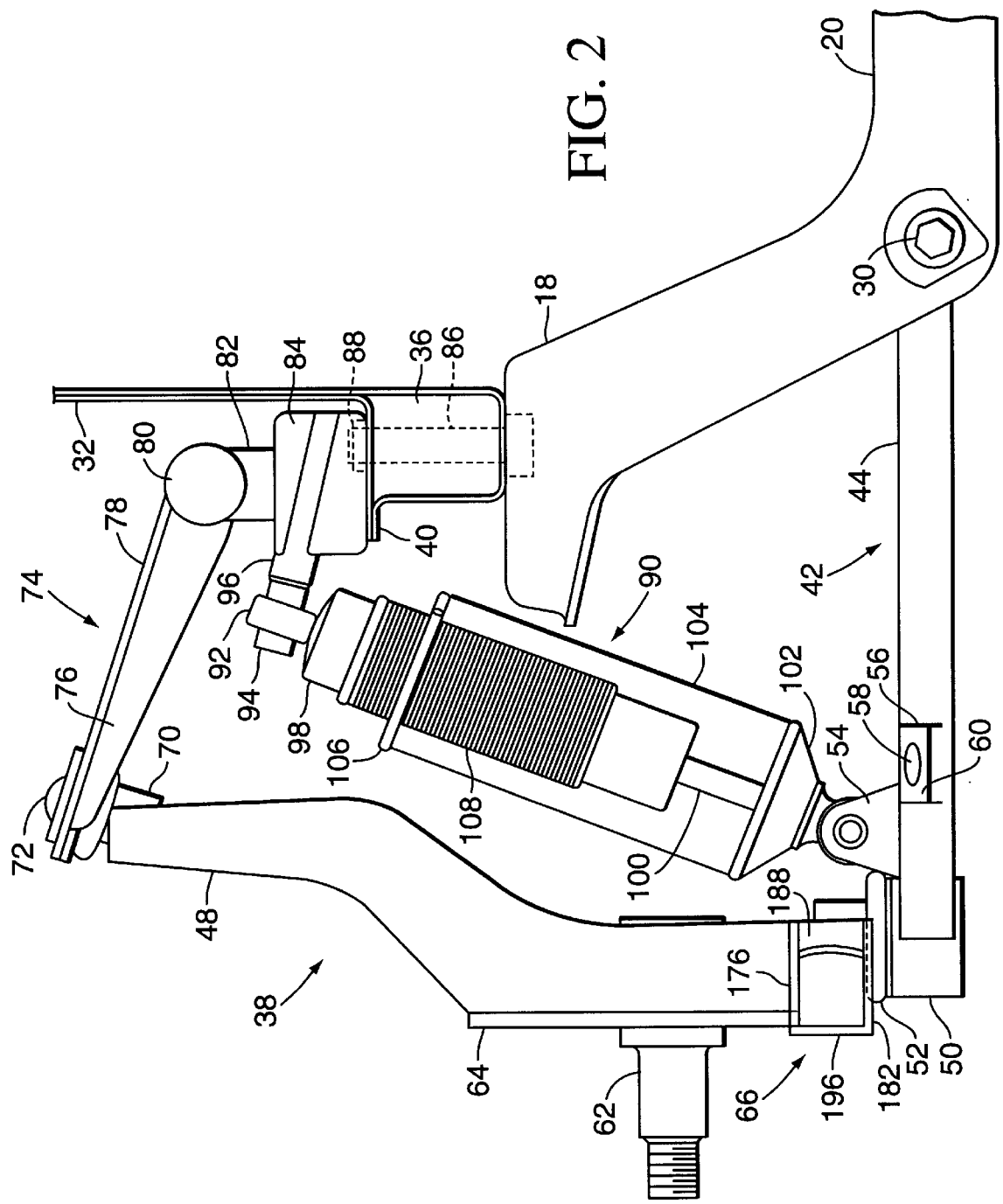
FIG. 2 is a diagrammatic presentation of the replacement independent suspension as installed on the hoist vehicle.

FIG. 2 is a diagrammatic representation of a preferred embodiment of a replacement independent suspension system of the invention after being assembled on the host vehicle. Specifically, FIG. 2, is an elevation view of the passenger side front suspension system from a viewing location in front of the right front wheel of the vehicle. Typically, a mirror image system would be installed on the driver side. However, if the stock frame and suspension mounting locations vary between the left and right sides of the vehicle, then the replacement components (including the conversion brackets) may need to be altered. For the preferred embodiment of the invention as adapted for a 1979 and later Ford Mustang, the left and right side replacement suspension systems are mirror images of each other.

The replacement suspension system, generally 38, shows a portion of the vehicle main frame 36 including a flat shelf section 40. This system 38 will be fastened to the vehicle using the stock mounting locations 30 and 34 as identified body. Specifically, the stock lower mounting locations 30 were originally employed to mount the lower control arm 12 of the stock MacPherson strut assembly 10. The stock mounting locations 34 were originally employed to fasten the sub-frame 20 to the vehicle main frame 36. In the preferred embodiment designed for the Ford Mustang, two heavy duty bolts 86 (only one of which is shown in FIG. 2) connect the main frame member 36 to the sub-frame member 20 at the raised spring perch 18.

The two lower stock suspension mounting locations 30 in the transverse vehicle sub-frame member 20 are employed to hold the replacement lower suspension A-arm 42 of the replacement kit 38. The lower suspension A-arm 42 of the replacement kit includes front 44 and rear 46 arms (see FIG. 12) that converge in an outboard direction from the lower A-arm mounting locations 30 towards a replacement spindle 48. The outboard end of the lower A-arms 44 and 46 meet and terminate at a lower ball joint support 50. In FIG. 2, the ball joint retained by the ball joint support 50 is shown covered with a boot 52. The lower A-arm 42 also includes a lower shock mount 54.

Figure 13:
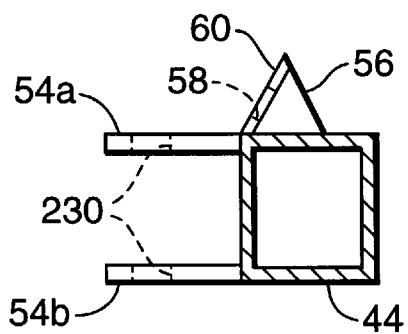
FIG. 13 is a side elevation view of the leading arm of the lower A-arm viewed looking towards the lower ball joint along lines A—A of FIG. 12.

The lower shock mounts 54, generally comprises two parallel plates having a somewhat triangular shape as shown, and in the preferred embodiment, are affixed to the leading (or front) arm 44 of the lower A-arm assembly 42. Also attached to this leading arm 44 of the lower A-arm assembly 42 is a stabilizer bar mounting tab 56 having an aperture 58 therein that will accommodate linkage to the stock transverse stabilizer bar (not shown) running from the left to the right lower A-arm locations 56. In its preferred form, as shown in FIG. 13, the stabilizer bar mounting tab 56 includes an upper surface 60 that is angled downward relative to the horizontal plane of the lower A-arm 44. This angle need not be severe (for example, between twenty and seventy degrees), but exists to aid in mounting the stock stabilizer bar and the bar linkage. The stock stabilizer bar and its linkage are not shown, but are well known conventional elements.

The outboard end of the lower A-arm assembly 42 supports a spindle 48 through the lower ball joint 50. The spindle 48 provides a mounting location for a wheel hub mounting shaft or stub axle 62. The stub axle 62 holds the wheel hub and brake disk or rotor (not shown), and may be integral with a hub mounting or main spindle plate 64. The main spindle plate 64 also provides support for the stock brake caliper which is not shown in this view. The lower outboard portion of the spindle 48 includes a steering arm mount and bump-steer box 66, as will be explained below. The steering arm mount is attached to the spindle 48 as well as to the main spindle plate 64, and is configured to accept the stock or original steering arm (also not shown in this view).

The spindle 48 extends to an upper ball joint support 70 which provides an upper mounting location for and retains an upper ball joint 72. The upper ball joint support 70 and the upper ball joint 72 are supported by an upper suspension A-arm assembly 74, which is also shown in FIG. 8. The upper A-arm 74 is of a unequal, shorter length than the lower A-arm member 42. As with the lower A-arm assembly 42, the upper A-arm assembly includes a leading arm 76 and a trailing arm 78 (not shown in FIG. 2). The inboard end 78 of the upper A-arm assembly 74 is pivotally connected to a cross-shaft 80, which is shown in greater detail in FIGS. 4, 6 and 8. The upper control arm cross-shaft 80 is carried by a pair of cross-shaft camber adjustable stantions 82, which are also shown in greater detail in FIG. 4. The stantions 82 are supported on an upper A-arm mounting conversion bracket or stand 84. The upper A-arm conversion bracket or stand 84 is carried by and supported on the flat shelf section 40 of the vehicle main frame 36, and is attached to the vehicle frame using stock (or if necessary replacement) bolts 86 and captive nuts 88. The bolts 86 are carried in the original or stock connecting locations between the frame member 36 and the raised spring perch 18 of the K-member 20. Thus, both the upper 74 and lower 42 A-arm assemblies are installed using original frame or suspension mounting locations, and no drilling, welding or cutting of the original frame members is required.

In order to provide the damping component of the front suspension system 38, a coil-over shock absorber, generally 90, is attached and mounted between the arcuately moveable lower A-arm assembly 44 and a fixed location provided by the upper A-arm conversion bracket 84. The upper end of the coil-over shock 90 includes a spherical bearing fitting 92, sized to accept a bolt 94. The bolt 94 is threaded into a shock mount 96 formed in or carried by the conversion bracket 36. The coil-over shock, may be any brand of performance shock, such as for instance a Koni brand universal coil-over shock, includes a cylinder 98 containing fluid and a rod 100 attached to a piston carried inside the cylinder 98. The rod 100 is grounded to and driven by the lower shock mount 54 of the lower A-arm assembly 42, typically with a spherical rod end and bolt connection. A spring perch 58 will support a coil spring, diagrammatically represented as 104. An upper spring retainer 106 is adjustably carried by means of a threaded body 108 of the fluid containing cylinder 98. The coil-over shock assembly 90 is conventional apparatus typically well known in high performance vehicle applications.

In other embodiments, the shock mounting and stabilizer bar locations may be on the trailing arm of the A-arm. In particular, for front wheel drive vehicles, it may be necessary to move the shock mounting location to a position further away or above the center line of the wheel hub in order to make room for the half-shaft that drives the wheel through the hub.

Referring now to FIGS. 3, 4 and 5, the upper A-arm mounting or conversion bracket 84 is shown in greater detail. The conversion or mounting bracket 84 fits to the stock main frame member 36, and supports or holds the cross-shaft 80 of the upper A-arm assembly 74, thereby replacing the MacPherson strut assembly 10.

The conversion bracket 84 comprises an angled channel section 110 to which a base plate 112 has been welded or otherwise attached. In its preferred embodiment, the conversion bracket 84 and base plate 112 are each approximately 3.0 inches wide and approximately 8.875 inches long. In addition, the angled channel section 110 is approximately 2.3625 inches high at the right or front edge, and is configured so that its top support surface 132 angles down at approximately a ten degree angle to the left or rear edge, which is approximately 0.7976 inches high. The angled nature of the conversion bracket provides an improved anti-dive geometry to the replacement suspension. Thus, the severity of the angle of the upper support surface determines the degree of anti-dive geometry. As an alternative and equivalent embodiment, it is possible to fabricate the conversion bracket as a rectangle, and provide different sized front and rear stantions 82 to achieve the anti-dive geometry. If desired, the kit can include multiple sets of front and rear stantions 82 to allow the user to change the anti-dive characteristics of the suspension.

The base plate 112 is provided with two fastener apertures 114 and 116 to provide access for the bolt 86 to attach the bracket 84 to the surface of the flat shelf section 40 shown in FIGS. 1 and 2. In its preferred form, a pair of captive mounting nuts 88 are provided in the base plate 112 of the upper A-arm conversion bracket 84. The location of these two captive nuts 88 corresponds with the location on the stock apertures through the interior of the vehicle main frame 36 and upper spring perch 18 of the transverse K-member 20, as shown in FIGS. 1 and 2. Thus, the center of aperture 114 is located approximately 1.250 inches to the right as viewed in FIGS. 4 and 5, whereas the aperture 116 is located approximately 0.6250 inches to the left as viewed in FIGS. 4 and 5. In that manner, the original 34 or slightly longer 86 bolts can be used to hold the A-arm conversion structure 84 by threading them into the captive nuts 88 through the same frame apertures used to hold the main frame member 36 to spring perch 18 of the K-member 20. The two attachment bolts 86 are threaded upward from the bottom of the raised spring perch 18 of the transverse vehicle sub-frame 20, through it and the aligned apertures in the vehicle main frame 36 and base plate 112, into the captive nuts 88 previously welded to the interior of the base plate 112 of the upper A-arm bracket 84.

The location and number of the apertures, such as 114 and 116, are likely to vary depending on the make and model of vehicle. For example, the apertures 114 and 116 as shown in FIGS. 4 and 5 are positioned with their centers spaced approximately 7 inches apart to accommodate the specific location and 7 inch spacing on the stock main frame bolts 34 used on a Ford Mustang made from 1979 through 1993. To fit properly on the more recent Ford Mustang made in 1994 and later, it is necessary to shift the apertures further to left (or rear) of the base plate 112 as viewed in FIGS. 4 and 5 to accommodate the slightly different location of the two stock frame mounting bolt locations for that later model Mustang.

Specifically, in the 1994 and later Ford Mustang, the two bolts 34 that mount the main longitudinal frame member 36 to the transverse K-member 20 are located further towards the rear of the vehicle. Thus, the two apertures 114 and 116 need to be shifted further to the left as viewed in FIGS. 4 and 5, so that aperture 114 is approximately 0.6250 inches from the left edge of the base plate 112, while the aperture 116 is approximately 1.250 inches from the right edge of base plate 112.

Of course, other sizes and shapes of an upper A-arm conversion bracket 84, and locations for mounting apertures 114 and 116, can be configured for other makes of host vehicles. However, one of the important advantages of the present invention is that it makes use of pre-existing stock mounting locations on the stock frame. For example, in the preferred embodiment designed for the Ford Mustang made between 1979 and the present, the replacement lower A-arm assembly 44 fits directly to the original mounting locations 30 for the stock lower control arm 12 of the MacPherson-strut suspension system 10. However, a conversion bracket 84 was designed to take advantage of existing frame mounting locations 34 that did originally hold any part of the stock MacPherson strut suspension system 10. Thus, depending on the make and type of vehicle, it may be necessary to carefully examine the existing frame to find pre-existing mounting locations that are easy for individuals of average mechanical skills to locate and use to mount the replacement parts.

A significant advantage of the independent double A-arm suspension in comparison to the MacPherson strut suspension system is its ease of adjustability. The present invention includes in the upper A-arm conversion bracket a camber and castor adjusting system. Specifically, a camber/castor adjustment nut plate or bar 118 is shown in the different views of FIGS. 4 and 5. The camber/castor adjustment plate 118 holds a pair of captive nuts 120 that are restrained (such as by welding or tabs) in an aligned manner behind elongated camber/castor adjustment channels 122 and 124. In the preferred embodiment, the left (or rear) camber/castor adjustment channel 122 is approximately 0.625 inches wide, 1.95 inches long, and is centered at a location 5.7625 inches to the left (or rear) of the front higher edge of the conversion bracket 84. In contrast, the right (or front) camber/castor adjustment channel is approximately 0.510 inches wide, and 1.95 inches long, and is centered at a location 2.6750 to the left (or rear) of the front higher edge of the conversion bracket 84.

As was explained above, the upper A-arm assembly 74 is mounted on a cross-shaft 80 that is in turn fastened with bolts 126 to the captive nuts 120 of the conversion bracket 84 through stantions 82. More specifically, as shown most clearly in FIG. 4, the upper A-arm support stantions 82 are placed so that a central bore 128 passing through each stantion aligns with the channels 122 and 124 and the nuts 120. The upper A-arm cross shaft 80 is similarly aligned with its bolt holes 130 aligned with the central bores 128 of the stantions 82, the camber adjustment channels 122 and 124 and the nuts 120. Heavy duty bolts 126 are threaded through the apertures 108 and 110 in the upper A-arm cross shaft 80, through the bores 130 of the cross-shaft camber adjustable stantions 82, through the camber adjustment channels 122 and 124, and into the respective nuts 120, thereby drawing the camber adjustment plate 118 up tight against the interior of the upper wall 132 of the support bracket 84. A single camber adjustment nut plate 118 is shown. However a separate plate for each nut 120 would work as well. An additional access aperture 134 is provided in the top surface 132 of the bracket 84 provides access to fastener 88.

By loosening the bolts 126 from the captive nuts 120, the entire upper A-arm assembly 74 can be moved on its cross shaft 80 in or out in the camber/castor adjusting channels 122 and 124 to vary the camber and castor settings. To assist in setting camber and castor, a pair of elongated threaded alignment adjustment screws 136, shown in FIG. 5, may be threaded into threaded holes 138, preferably on a temporary basis, to allow adjustment of the position of the camber plate 118 relative to the adjustment grooves or channels 122 and 124. By carefully counting rotations of the individual adjustment screws 136 (or by using alignment tools), the upper control arm cross-shaft 80, and hence the upper A-arm assembly 74, can be carefully set at desired inboard or outboard positions in the camber/castor adjustment channels 122 and 124 to adjust for camber, castor and Ackerman. Once proper camber, castor and Ackerman adjustment are achieved, the bolts 126 are tightened into the nuts 120 to securely fasten the upper control arm cross-shaft 80 and support stantions 82 to the top surface 132 of the conversion bracket 84. Thereafter, the threaded adjustment screws 136 can be removed until needed for subsequent adjustment.

Referring to FIGS. 3 and 6, an upper shock mounting boss 140 is fixedly mounted (such as by welding) to, and is part of, the conversion bracket 84. The shock mounting boss 140 has a threaded interior bore 142 to accept a heavy duty fastener 94 that holds the spherical bearing fitting 92 (FIG. 2) of the coil-over shock assembly 90 to the conversion bracket 84. In its preferred embodiment, the boss 140 is approximately 1 inch in diameter, 3.6 inches long and has an internal bore 142 that is 0.4375 inches in diameter tapped to receive a ½ by 13 bolt 94. The upper shock mounting boss 140 is mounted at an angle within the upper A-arm support bracket 46 to accommodate the angle at which the shock assembly 90 leans inboard from the spindle 38 as best shown in FIGS. 2 and 3. More specifically, in the preferred embodiment the center line of the bore 142 terminates at the inboard side 144 of the bracket 84 at a depth of about 1.4377 inches below the top surface 110. A recess 104 may be machined into the boss 102 to provide access to fastener 88 passing through aperture 116.

Thus, the conversion bracket 84 serves the multiple purposes of mating the upper A-arm assembly 74 to stock mounting locations 86 in the main frame 36, allowing supporting the upper A-arm so that camber and castor can both be easily adjusted, and providing an upper shock mounting.

Shown in FIGS. 6 and 7 are more detailed views of the cross-shaft 80 that is attached to the top of the A-arm conversion bracket 84 (see FIG. 4). In FIG. 6, a bushing (optional) and washer/bolt assemble are shown to demonstrate one The cross-shaft 80 includes apertures 130 for suitable fasteners, usually heavy-duty bolts 126, which pass into the elongated camber/castor adjustment slots 122 and 124 of the conversion bracket 84. Machined top and bottom surfaces 148 of the cross-shaft 80 provide a flat surface to aid in secure mounting of the cross-shaft to the bracket 46. The outboard ends 150 of the cross shaft 80 are formed as bearing surfaces to rotatably cooperate with suitable rubber, polyurethane, or metal bushings 152 as shown in FIG. 6. Threaded bores 154 are provided so that a large diameter washer 156 and bolt 158 can be inserted to retain both ends of the cross-shaft 80 within the ends of the two arms of the upper A-arm assembly 74.

In its preferred form, the cross-shaft 80 begins as a 1.25 inch diameter bar stock, with the outboard ends 150 machined down to 0.875 inch bearing surfaces having threaded bores 152 sized at 0.3750 inches to receive a heavy duty bolt 158. Each bearing surface 150 is approximately 1.50 inches long, and the two mounting apertures 130 are centered with a 3.150 inch spacing between them. Of course, a different size cross-shaft may be required for different width of A-arms as designed for different makes or models of vehicles.

The driver's side upper A-arm assembly 74 is shown in greater detail in FIG. 8. The passenger A-arm (shown more generally in FIG. 2) is a mirror image of the assembly shown in FIG. 8. The inboard ends of each the front 162 and rear 164 A-arms are provided with circular bushing retainers 160. The cross-shaft 80 is placed in the bushing retainers, and then the bushings 152 are inserted between the bearing surfaces 150 of the cross-shaft 80 and the retainers 160. A large diameter washer 156 is then placed over the end of the bushings 152, and a heavy-duty bolt 156 is threaded into the bore 154. In that the manner, the upper A-arm assembly 74 is installed on cross shaft 80, which is then ready to be bolted (only one of which is shown) to the conversion bracket 84 as described above. If desired, the preferred embodiment could be modified to use spherical bearings (also known as "Heim Joints") to connect the upper A-arm assembly to an appropriately modified conversion bracket.

At the outboard end of the upper A-arm assembly 74 is a ball joint bracket 166. The ball joint bracket 166 is either formed or welded in place on the end of the upper A-arm assembly 74, and includes a central ball joint aperture 168 and several bracket bolt holes 170. The upper ball joint 70 typically includes a bracket (not shown) that is bolted through the bracket bolt holes 170. In its preferred embodiment, the upper ball joint aperture comprises a circle with a radius of approximately 1.200 inches and having a center that is approximately 5.500 inches from the axial center line of the bores 154 of the cross-shaft 80. The front arm 162 is angled towards the center of the ball joint aperture 168 approximately 26 degrees from the dotted line 172 drawn perpendicular to the axial center line of the bores 154 as shown in FIG. 8. The rear arm 164 is angled towards the center of the ball joint aperture 168 approximately 15 degrees from the dotted line 174 drawn perpendicular to the axial center line of the bores 154 as shown in FIG. 8. Of course, different upper A-arm assemblies will be required for different make and model vehicles.

An alternative upper A-arm conversion bracket would replace the stantions 82 of FIG. 4 with raised adjustable cross-shaft camber/castor slide supports that are bolted or welded to the top surface 132 of the conversion bracket 84. Each of the slide supports would include in their top surfaces a camber/castor adjustment aperture similar to the apertures 122 and 124 of the preferred embodiment. The bolts 126 fastening the cross-shaft 80 to the slide supports would be shorter than in the preferred embodiment shown in FIG. 4, and the captive nuts 120 would be placed on the underside of the slide supports instead of the underside of the top plate 132. Camber adjustment would be obtained in a manner similar to that explained above, by loosening the bolts 126 and sliding the upper A-arm inboard or outboard in the apertures.

Figure 9:
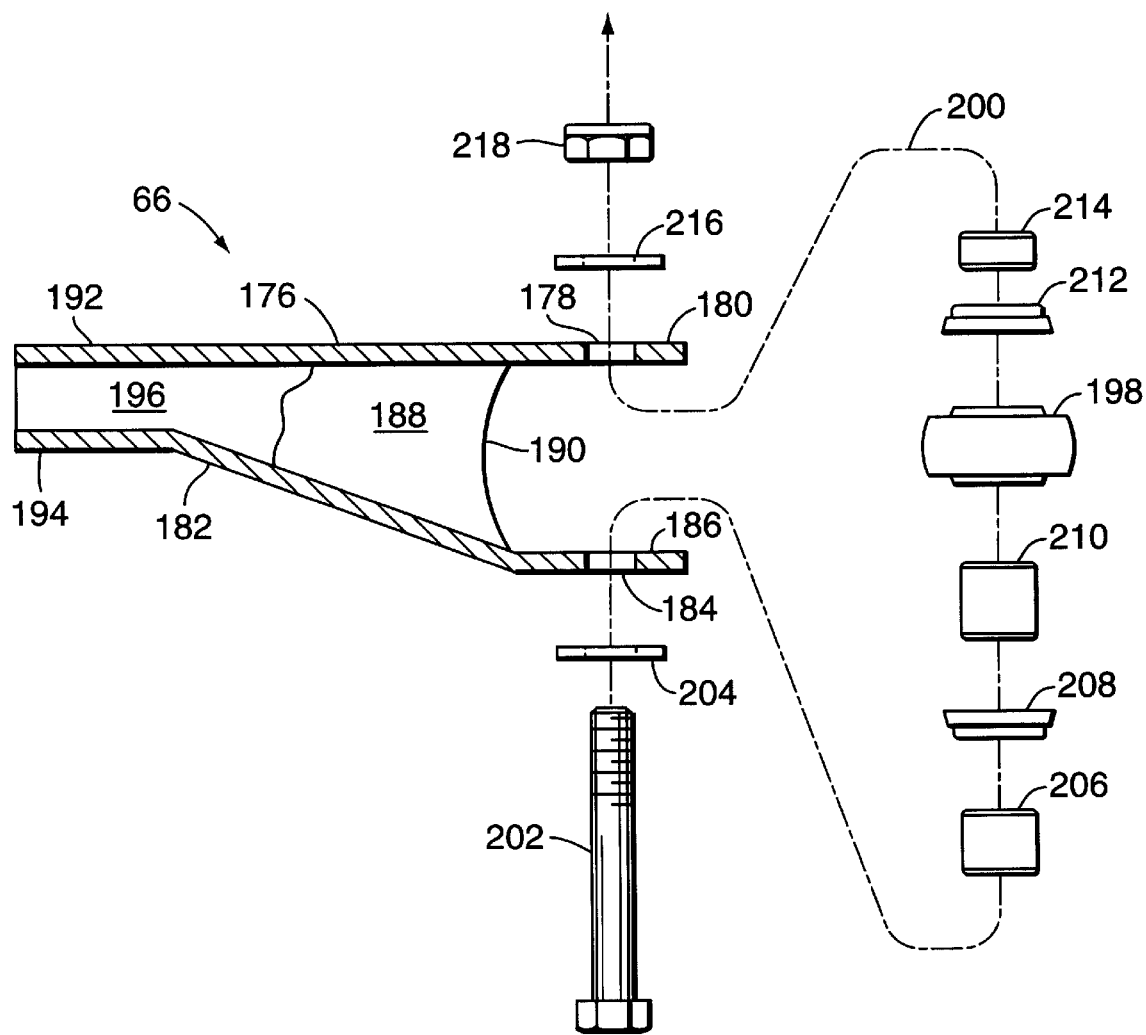
FIG. 9 is an expanded view of a steering arm and bump chamber.

Returning to the preferred embodiment, FIG. 9 is a partially expanded view of the steering arm/bump steer box 66, depicting the components and order of assembly for connecting the stock steering arm to the steering arm/bump steer box or chamber 66. This steering arm/bump box 66 is fixedly attached (such as by welding) to the lower portion of the main spindle plate 64 (FIGS. 2, 10) and the lower portion of the spindle 48. While FIG. 9 shows a right side unit, the left side unit will be a similar mirror image. The top steering arm plate 176 provides one wall of the steering box, and is provided with an aperture 178 at an outboard end 180 thereof. A lower steering arm plate 182 forms a second wall of the steering box, and is provided with an aperture 184 at its outboard end 186 aligned with the upper steering arm aperture 178. The upper 176 and lower 182 steering arm plates are connected together by a first inside web plate 188 forming a third wall of the steering arm box, and having a curved clearance end at 190. A second outside web plate 196 also connects the upper 176 and lower 182 steering arm plates, and forms the fourth wall of the steering box. In FIG. 9, the second outside web plate 196 is depicted with a portion removed to show the inside web plate 196. The steering box 66 accommodates the outboard end of the steering tie rod 198. The tie rod end 198 is mounted between the outboard ends 180 and 186 of the steering arm/bump steer box.

In its preferred form, upper steering arm plate 176 is relatively straight as viewed in FIG. 9, whereas the lower plate 182 includes an flat inboard portion 194 that is approximately 1.750 inches long, followed by a mid-section that angles down at about 18 degrees to meet the flat outboard section 186. The inboard flat portions 192 and 194 of the upper 176 and lower 182 plates are spaced apart about 0.7529 inches, whereas the outboard portions 180 and 186 are spaced apart about 1.850 inches at their interior faces. The center of the apertures 178 and 186 are located approximately 6.06 inches from the inboard end 192 of the top plate 176. Of course, the characteristics of the bump steer box will vary depending on vehicle make and model.

The bump steer characteristics of the vehicle are adjusted by placing spacers and washers of various thickness between the steering tie rod end 198 and the top 180 and bottom 186 outboard ends if the steering arm plates 176 and 182. The order of assembly for the preferred embodiment is indicated by the exploded components along the line 200. A large bolt, such as 0.500 inch by 3.000 inch bolt 202 is inserted through a flat washer 204 on the exterior of the lower plate 182, and then through the lower aperture 184. A large bottom shim 206 approximately 0.650 inches wide is inserted over the bolt 202 inside the lower plate 186, followed by a rubber sealing washer 208. A rod end sleeve 210 approximately 0.750 inches wide fits between the central bore (not shown) in the rod end 198. A second rubber sealing washer 212 is placed over the rod end 198, followed by a smaller top bump shim 214 approximately 0.360 inches thick. The bolt 202 is inserted through the top aperture 178, a second washer 216 and a nylock nut 218. The entire assembly is then tightened.

In general, "bump steer" refers to how much and in which direction the toe or camber of the front wheels change as the wheel and tire assembly is moved up and down through the range of suspension travel. Zero bump steer is generally desirable. Briefly, the amount and direction of bump steer effect is primarily determined by the plane of the steering arm in relation to the upper and lower A-arm planes. By raising or lowering the steering arm in the bump steer box 66, the relationship of the steering arm to the A-arms can be altered, thereby altering bump steer characteristics. This is done by selecting the appropriate height dimensions of the bottom bump steer shim 206 and the top bump steer shim 214. This specific adjustment is influenced by the location of the steering arm pivot point; the spindle inclination and vertical axis; the A-arm mounting locations; and the angles, the location and length of the tie rods as connected to the steering box. For more information on how to measure and adjust bump steer, see *Chassis Engineering* by Herb Adams, HP Books, 1993.

Figure 10:
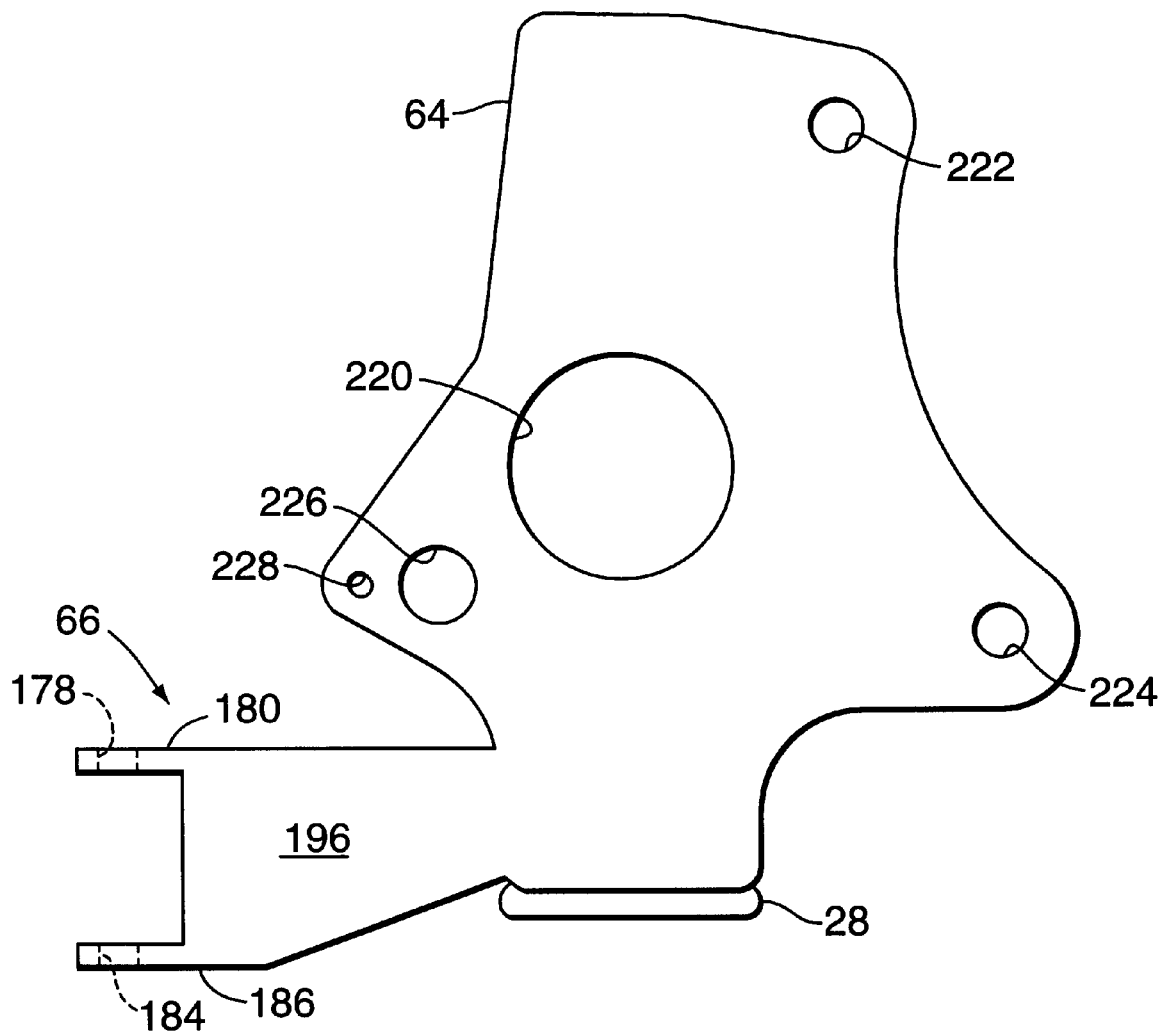
FIG. 10 is a side elevation view of the main spindle plate.

FIG. 10 is an elevation view of the driver side main spindle plate 32. The passenger side plate will be a mirror image of the drive side plate. The main spindle plate 64 is welded to the outside of the spindle 48 as shown in FIG. 2. The spindle plate 64 includes a central axle bore 220 through which a stub axle 62 is welded. Apertures 222 and 224 provide mounting points for the original equipment disc brake caliper housing. The two smaller apertures 226 and 228 are located outboard of the large aperture 220 on the main spindle plate 64, and are provided to accommodate the stock ABS (Antilock Braking System) sensor or pickup element and its attachment mounting bolt respectively, neither of which are shown. As stated above, the steering arm/bump steer box 66 will be welded to the spindle plate 64 at generally a right angle thereto and projecting somewhat outwardly from the major plane of the spindle plate 64. The outside web plate 98 is shown in FIG. 10, along with the upper 180 and lower 186 outboard ends of the upper and lower plates. The lower ball joint cover or boot 28 is shown at the bottom of FIG. 10.

In its preferred embodiment, the overall width of the main spindle plate 84 is approximately 7.2250 inches, and its overall height 8.3578 inches. The apertures 222, 224 and 226 are preferably located in the main spindle plate 64 at the same locations relative to the axle 62 as on the stock spindle 22, thereby allowing bolt on replacement of the brake components. In other words, the stock hub, wheel and brake assemblies fit directly on the replacement spindle 64.

Figure 11:
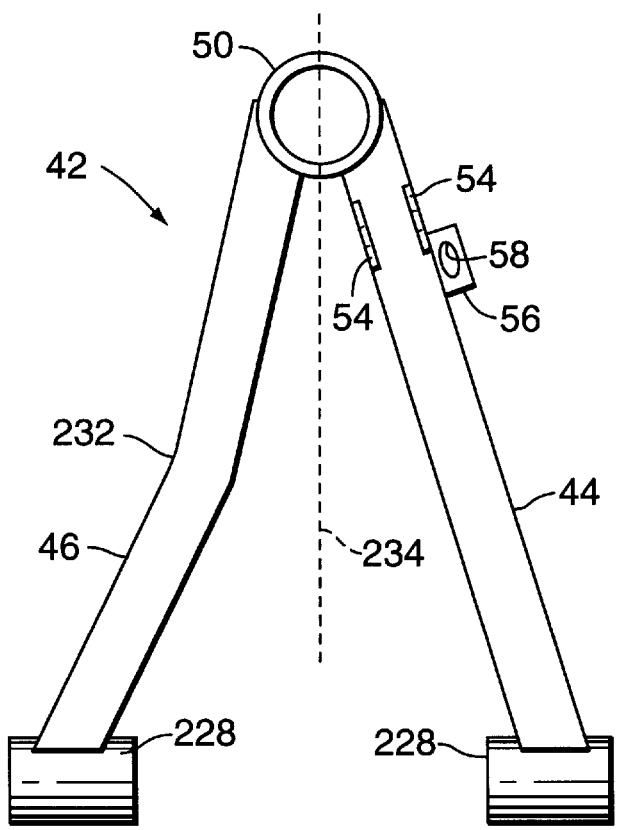
FIG. 11 is a top elevation view of the lower A-arm assembly.
Figure 12:
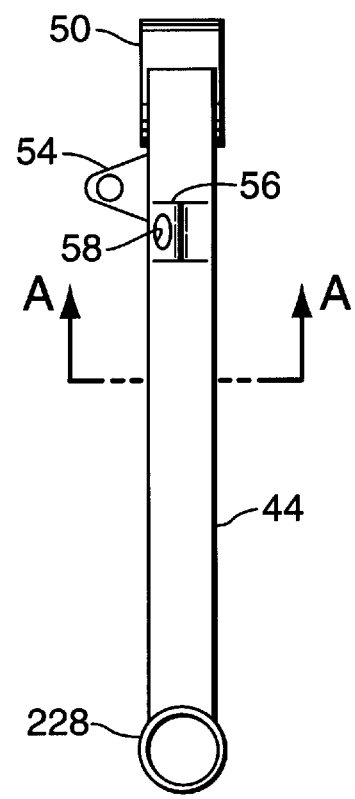
FIG. 12 is a side elevation view of the leading arm of the lower A-arm assembly.

FIGS. 11 and 12 show in greater detail a driver side lower A-arm assembly 42 with the locations for the lower shock mount 54 and stabilizer bar mounting tab 56 of FIG. 2. The passenger side lower A-arm would be a mirror image of the driver side A-arm. In FIG. 11 the front of the vehicle would be towards the straight lower A-arm strut 44. As discussed above, the leading lower A-armn 44 includes near its outboard end a stabilizer bar mount 56 with a mounting bore 58, along with the triangular lower shock mounts 54. At its inboard end are two bearing sleeves 228. Rubber, polyurethane or other appropriate bushings (not shown) are inserted in the sleeves 228, which are then bolted to the lower A-arm mounts 30 shown in FIG. 2. As an alternative, the ends of the leading 44 and trailing 46 A-arms can be fitted with heim joints, which are then bolted to the mounting locations 30 with appropriate spacers or adapters. FIG. 13 is a side view of the leading armn 44 of taken along line A—A of FIG. 12, and shows in greater detail the walls 54a and 54b of the lower shock mount 54. The two bores 230 are shown for the fastener that holds the shock assembly 90. Also shown in FIG. 13 is the angled stabilizer bar mount 56, with the bore 58 in the upper surface 60 to receive the stock stabilizer bar end (not shown).

In the preferred embodiment, the leading arm 44 of the lower A-arm assembly is approximately 14.1024 inches long measured from the center of the lower ball joint support 50. The leading arm 44 is angled away approximately 17 degrees from a reference line 234 drawn between the center of the lower ball joint support and dissecting the leading 44 and trailing 46 arms. The sleeve 228 at the inboard end of the leading A-arm 44 is approximately 2.400 inches wide, and has an outside diameter of approximately 1.750 inches. The trailing A-arm 46 includes a small kink 232 located approximately 7.2616 inches from the center of the lower ball joint support 50, and angles away from the line 234 approximately 13 degrees. The inboard straight portion of the trailing A-arm 46 is about 7.0418 inches long, and is angled an additional 13 degrees away from the reference line 234. The sleeve 228 at the inboard end of the trailing arm 44 is approximately 2.5650 inches wide, and has an outside diameter of approximately 1.750 inches. Each A-arm is fabricated from approximately 1.5 inch square tubing.

The typical kit of parts used to replace a MacPherson front suspension system will include: a lower A-arm assembly; a spindle having lower and upper ball joints, an upper A-arm assembly; an upper A-arm conversion bracket or stand and the associated cross-shaft and stantions; a coil-over shock absorber and spring assembly; a bump-steer shim kit with a variety of spacers; and the necessary fasteners, spacers, seals, washers, bushings and detailed instructions for use by the installation team. Extended kits for high performance or racing applications are also contemplated, including upgraded brake and stabilizer bar systems to replace the stock systems.

The installation of the kit of parts presented herein entails the acts of: disconnecting the stock steering arm and stabilizer bar; removing the stock brake and wheel assemblies from the stock MacPherson strut suspension; removing the stock MacPherson strut suspension components including the strut and spring; installing the new upper A-arm conversion stand or bracket using existing fastener location points on the host vehicle; installing the cross-shaft and stantions on the conversion stand; installing the replacement lower A-armn at the stock lower control arm mounting locations; attaching the upper A-arm structure to the cross shaft; attaching the new spindle to the lower and upper A-arm; attaching the coil-over shock to the lower A-arm and to the boss of the conversion bracket; re-connecting the steering tie rod to the steering arm/bump box; re-connecting the stabilizer bar to the stabilizer bar mounting tab; re-mounting the brake and wheel assemblies to the spindle; realigning the tow, camber, castor, Ackerman, and bump-steer. Each of those operations (except possibly for the alignment) can be conducted by a person of marginal mechanical skill using common hand tools. Of course, the order in which the stock components are removed and the replacement components installed is in general not critical.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the spirit and scope of the invention and the following claims. For example, by moving the replacement shock absorber to make room for a half-shaft, and by further modifying the spindle as discussed above to accommodate the half-shaft, a replacement kit can be made to replace MacPherson strut suspension systems on front-wheel drive vehicles.

By way of further example, included throughout this specification are the dimensions of the various components of a preferred embodiment of the invention. The invention is not to be limited to the dimensions and specific configuration of the individual components, but rather, other dimensions and configurations that allow a double A-arm type of suspension to be substituted for a stock MacPherson strut suspension system using ordinary hand tools and without requiring modification to the stock frame or body.

What is claimed is:

1. A kit of components that replaces a stock MacPherson strut and spring front suspension assembly of a host vehicle, wherein the host vehicle includes in its stock configuration: (i) front left and right steering arms; (ii) a front stabilizer; (iii) front left and right MacPherson struts; (iv) front left and right springs; and a front frame portion comprised of main ladder frame elements and a transverse sub-frame; wherein the main ladder frame is bolted to a raised portion of the transverse sub-frame that is configured to retain the stock spring, the transverse sub-frame includes original inboard mounting locations for left and right lower control arms of the stock MacPherson strut suspension assembly; and the main ladder frame includes a relatively flat shelf portion proximate the location where it is bolted to the raised portion of the transverse sub-frame; and wherein the kit of components comprises:

(a) left and right lower A-arm assemblies, each A-arm assembly being constructed with two arms having inboard mounting locations that mate with original inboard mounting locations for the respective lower control arms of the stock MacPherson strut suspension assembly, and wherein at least one arm of each lower A-arm assembly includes (i) a lower shock mount, and (ii) a stabilizer bar mount located to receive the end of the stock stabilizer bar;

(b) left and right upper A-arm conversion brackets, each conversion bracket being configured to bolt to the shelf portion of the main ladder frame at stock locations where the main ladder frame is bolted to the raised portion of the transverse sub-frame, and each upper A-arm conversion bracket including (i) upper A-arm mounting locations and (ii) an upper shock mount;

(c) left and right upper A-arms, each upper A-arm being mounted to respective left and right upper A-arm mounting locations of the left and right upper A-arm conversion brackets;

(d) left and right spindles coupled between the left and right upper and lower A-arms, respectively, each spindle including: (i) a steering arm mount located to receive the stock steering arm, (ii) an axle mount, and (iii) a spindle plate; and (e) left and right shock and spring assemblies, each assembly being coupled between the lower shock mount of the respective left and right lower A-arm and the upper shock mount of the respective left and right upper A-arm conversion brackets.

2. The kit of claim 1 wherein each of the left and right upper A-arm conversion brackets includes a camber adjuster, each camber adjuster including two parallel adjustment slots.

3. The kit of claim 2 further comprising left and right upper A-arm cross-shafts, each cross-shaft including two inboard fastener apertures spaced to mate with the two parallel adjustment slots in the camber adjuster.

4. The kit of claim 3 further comprising adjustable fasteners that are inserted in the fastener apertures of each cross shaft and the parallel adjustment slots of the camber adjuster to fixedly mount the cross-shaft on the conversion bracket.

5. The kit of claim 4 further comprising a pair of cross-shaft camber adjustment stantions, each stantion including a fastener bore and being configured to be placed between one of the parallel camber adjustment slots of the conversion bracket and the fastener aperture of the upper A-arm cross-shaft.

6. The kit of claim 1 wherein the steering arm mount includes a bump-steer box configured to retain a plurality of spacers of varying thickness in a variety of combinations to allow adjustment of vehicle bump steer characteristics.

7. The kit of claim 1 wherein the host vehicle comprises a 1979 or later Ford Mustang, the transverse sub-frame comprises a stock K-member including a raised spring perch that is bolted to the front portion of the main ladder frame member with two spaced apart bolts, and wherein (a) each lower A-arm is mounted to original mounting locations in the stock K-member for the lower MacPherson strut control arm; and (b) each upper control arm conversion bracket is mounted to the main ladder frame member using original apertures for the two spaced apart bolts that couple the front portion of the main ladder frame member to the spring perch of the K-member.

8. A conversion bracket that allows a replacement A-arm assembly to be installed on a host vehicle in place of a stock MacPherson strut assembly, the A-arm assembly including two arms that are coupled together at their outboard ends and extend apart from each other in an inboard direction, the conversion bracket comprising:

(a) an interface plate including at least two fastener apertures that are located to attach the interface plate to the host vehicle using stock fastener locations on the vehicle;

(b) a support surface including two extended camber/castor channels;

(c) two side support plates that extend between the interface plate and the support plate; and (d) an adjustable A-arm retention system that holds inboard ends of the A-arms in the camber/castor channels.

9. The conversion bracket of claim 8 wherein the adjustable A-arm retention system comprises:

(a) a camber/castor adjustment plate with two fastener apertures spaced so as to align with the two camber/castor channels, and positioned between the interface plate and support surface;

(b) a cross-shaft having axle surfaces formed at each end, the cross-shaft having two fastener apertures between the ends of the cross-shaft spaced so as to align with the two camber/castor channels;

(c) two stantions placed between the support surface and the cross-shaft, each stantion including a central bore aligned with the fastener apertures in the adjustment plate and the cross-shaft, and further aligned with the camber/castor channels; and (d) two fasteners, each fastener being inserted through one of the aligned fastener apertures in the cross-shaft, through the central bore of an aligned stantion, through an aligned camber/castor channel, and through an aligned aperture in the adjustment plate, each fastener configured so as to be adjusted between loose and tight conditions.

10. The conversion bracket of claim 8 further comprising a shock mount configured to hold a replacement shock absorber.

11. The conversion bracket of claim 8 wherein the support surface has a front edge and a rear edge, and the support surface of the conversion bracket is angled down from the front to the rear so as to provide an anti-dive geometry.

12. A conversion bracket that allows a replacement A-arm assembly to be installed on a host vehicle in place of a stock McPherson strut assembly, the A-arm assembly including two A-arms that are coupled together at their outboard ends and extend apart from each other in an inboard direction, the conversion bracket comprising:

(a) an interface plate including at least two fastener apertures that are located to attach the interface plate to the host vehicle using stock fastener locations on the vehicle;

(b) a support surface including two extended camber/castor channels;

(c) two side support plates that extend between the interface plate and the support plate;

(d) an adjustable A-arm retention system that holds the inboard ends of the A-arms in the camber/castor channels, the adjustable A-arm retention system including a camber/castor adjustment plate with two fastener apertures spaced so as to align with the two camber/castor channels, and positioned between the interface plate and support surface; a cross-shaft having axle surfaces formed at each end, the axle surfaces being rotatably coupled in sleeves formed at the inboard ends of the A-arms spaced so as to align with the two camber/castor channels; two stantions placed between the support surface and the cross-shaft, each stantion including a central bore aligned with the fastener apertures in the adjustment plate and the cross-shaft, and further aligned with the camber/castor channels; and two fasteners, each fastener being inserted through one of the aligned fastener apertures in the cross-shaft, through the central bore of an aligned stantion, through an aligned camber/castor channel, and through an aligned aperture in the adjustment place, each fastener configured so as to be adjusted between loose and tight conditions.

13. The conversion bracket of claim 12 further comprising a shock mount configured to hold a replacement shock absorber.

* * * * *